United States Patent
Van Kessel et al.

[11] Patent Number: 5,759,362
[45] Date of Patent: Jun. 2, 1998

[54] ELECTRODE FOR ELECTROCHEMICAL MACHINING

[75] Inventors: Roland P. Van Kessel; Petrus A. Rensing; Franciscus H. M. Sanders; Cornelis G. Visser, all of Eindhoven, Netherlands

[73] Assignee: U.S. Philips Corporation, New York, N.Y.

[21] Appl. No.: 754,339

[22] Filed: Nov. 22, 1996

Related U.S. Application Data

[62] Division of Ser. No. 563,472, Nov. 28, 1995, abandoned.

[30] Foreign Application Priority Data

Nov. 28, 1994 [EP] European Pat. Off. .............. 94203441

[51] Int. Cl.$^6$ .............................. C25B 11/04; C25C 7/02
[52] U.S. Cl. .................... 204/290 R; 204/291; 204/292; 204/293; 204/294
[58] Field of Search ................... 204/290 R, 292, 204/293, 294, 291

[56] References Cited

U.S. PATENT DOCUMENTS

| | | | |
|---|---|---|---|
| 3,120,482 | 2/1964 | Williams | 204/224 |
| 3,243,365 | 3/1966 | Aikin | 204/290 R |
| 3,276,987 | 10/1966 | Williams | 204/224 |
| 3,436,331 | 4/1969 | Dietz et al. | 204/224 |
| 3,441,493 | 4/1969 | Williams | 204/224 |
| 3,485,744 | 12/1969 | Schaffner | 204/290 R |
| 3,647,674 | 3/1972 | Joslin | 204/284 |
| 3,972,797 | 8/1976 | Hagen et al. | 204/290 R |
| 4,136,006 | 1/1979 | Verspui | 204/290 F |
| 4,988,425 | 1/1991 | Everhart | 204/224 M |

*Primary Examiner*—Kathryn L. Gorgos
*Assistant Examiner*—Chrisman D. Carroll
*Attorney, Agent, or Firm*—Steven R. Biren

[57] ABSTRACT

An electrode (2) for electrochemically machining electroconductive workpieces (1), which is provided with electrically insulating layers (4, 4') of a hybrid inorganic polymeric material on the basis of silicon oxide and zirconium oxide obtained by means of a sol-gel process. The insulating layers (4, 4') can be provided on the electrode at a low temperature and exhibit a small leakage current.

4 Claims, 1 Drawing Sheet

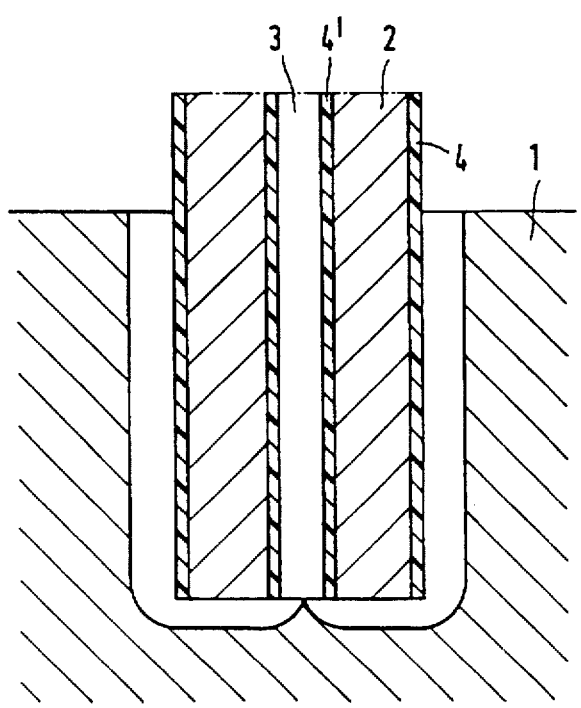

ELECTRODE FOR ELECTROCHEMICAL MACHINING

This is a division of application Ser. No. 08/563,472, filed Nov. 28, 1995, now abandoned.

BACKGROUND OF THE INVENTION

The invention relates to an electrode for electrochemical machining, in particular for removing metal from electroconductive workpieces, which is locally covered with an insulating layer.

The invention also relates to a method of manufacturing such an insulating layer on an electrode.

Electrochemical metal removal takes place in an electrolyte solution in which the workpiece to be shaped is placed as the anode and the electrode as the cathode, an electric current being applied between the workpiece and the electrode. The electrode serves as a shaping tool. The workpiece, which serves as the anode, dissolves locally, for example, in the form of metal hydroxide, while hydrogen is formed at the electrode surface. The advantage of said method of removing metal is that the tool is not subject to wear or attack. In literature, such a machining method is commonly referred to as Electrochemical Machining (ECM).

The usual electrolytes consist of solutions of a salt in water, in general NaCl solutions or $NaNO_3$ solutions.

In order to carry out the electrochemical machining process with sufficient accuracy, the distance between the electrode and the workpiece is kept small, for example 0.01–0.1 mm. In order to keep said distance substantially constant, the electrode must be moved towards the workpiece at a certain velocity, i.e. a velocity which is equal to the rate of dissolution of the workpiece. The electrolyte is pumped through the electrode gap at a relatively high velocity to carry away the metal hydroxide, hydrogen and heat generated. A fairly large amount of heat develops in the electrolyte liquid because, in practice, electrolysis current densities up to 500 A per $cm^2$ of machined surface occur.

The accuracy of said machining method is improved considerably by providing an electrically insulating layer on the electrode at the area where current passage is undesirable. If the machining operations should meet high accuracy requirements, this insulating layer must be as thin as possible, for example 10 μm or less.

Different types of insulating materials have already been proposed. Layers of epoxy resins comprising different types of curing agents have the disadvantage that they are sensitive to water absorption. During deposition of said layers, they absorb water from the environment, which disappears when the layer is heated, but not without causing porosity and cavities in the insulating layer. Silicone resins are slightly better in this respect, but still not good enough. Polyurethane layers have the disadvantage that they absorb hydrogen, which causes them to decompose. Also polyester imide layers have this disadvantage, yet to a much lesser degree. Besides, all these organic coatings can only be provided if the shape of the electrode is not too complicated. Finally, at the layer thicknesses required for accurate machining operations, these insulating layers are insufficiently insulating and are likely to become detached from the electrode surface as a result of the evolution of hydrogen.

In U.S. Pat. No. 4,136,006, a description is given of an inorganic insulating layer for an ECM electrode, which layer is composed of polycrystalline SiC and an intermediate layer, for example, of $Si_3N_4$, $SiO_2$, BN or $Al_2O_3$. The layers described therein are provided by means of a CVD process (Chemical Vapour Deposition) in a reactor at a temperature of 800° C. (for $Si_3N_4$), 1300° C. (for SiC) and 1600° C. (for BN). As the process must be carried out at a high temperature, refractory metals such as molybdenum or tungsten are used as the electrode.

A drawback of the known ECM electrode is that expensive vacuum, dose-measuring and control equipment is necessary to apply the insulating layer. In addition, such a batch process involves long process times owing to the evacuation, warming-up and cooling-down of the reactor. Another disadvantage is that owing to the high process temperatures only refractory metals can be used as the electrode material.

SUMMARY OF THE INVENTION

It is an object of the invention to provide, inter alia, an electrode for carrying out electrochemical machining operations, which electrode is covered with an electrically insulating layer which can be provided in a simple manner at relatively low temperatures, so that electrodes of copper or copper alloys can be used. The layer must have a sufficiently high electrical resistance and bond well to the metal of the electrode. Said layer must also be resistant for a long period of time to the process conditions during electrochemical machining. It must also be possible to apply said layer without using expensive vacuum and control equipment. The invention further aims at providing a simple method of manufacturing such an insulating layer, which can be carried out at a relatively low temperature, for example below 200° C.

The object of providing an electrode for electrochemical machining, which electrode is provided with an insulating layer, is achieved by an electrode as described in the opening paragraph, which is characterized in accordance with the invention in that the insulating layer comprises an inorganic network of silicon oxide and zirconium oxide as well as a carbon-containing polymer which is chemically bonded to and intertwined with said inorganic network via Si—C bonds.

The insulating layer on an electrode in accordance with the invention is composed of a hybrid inorganic-organic material and does not only comprise the inorganic network of silicon oxide and zirconium oxide but also a carbon-containing polymeric component. Specific C atoms of the polymer are chemically bonded to Si atoms of the inorganic network. The polymeric chains are intertwined with the inorganic network and together they constitute a hybrid inorganic-organic network. The chemical bond between the polymeric component and the inorganic network results in mechanically robust and thermally stable coatings. By virtue of the polymeric component in the inorganic network, relatively thick insulating layers up to approximately 20 μm can be manufactured without causing crackles in the layer. The bond between the coating and metal surfaces is very good. Such a hybrid coating is known per se from an article by H. Schmidt et al. in "Ultrastructure Processing of Advanced Ceramics" (1988), John Wiley & Sons, pp. 651–660. The coating described therein is used as a scratch-resistant protective coating for synthetic resin lenses.

Examples of polymeric components are polyether, polyacrylate and polyvinyl.

The incorporation of zirconium oxide into the network of silicon oxide provides the layer with a better resistance against electrolytes. Zirconium oxide also improves the mechanical properties of the layer, such as hardness, abrasion resistance and scratch resistance.

The insulating layer comprises 1 to 50 mol %, preferably 5 to 35 mol %, zirconium oxide relative to silicon oxide. Below 1 mol %, the favourable effect occurs insufficiently, whereas above 50 mol % no further improvement occurs and the layer becomes unnecessarily expensive.

Insulating layers are manufactured in thicknesses of 0.5 to 10 μm for electrodes which are used for electrochemical machining. The electrical resistance of these layers is sufficient to use these layers on electrodes for electrochemical machining.

For the electrode material, use can be made of metals which are customarily used for electrodes, such as molybdenum, tungsten, titanium and stainless steel. Because of its good electroconductivity and resistance in the customary electrolytes, preferably, copper or a copper alloy such as bronze or brass is used as the electrode material.

The object of providing a simple method of manufacturing an electrode with an insulating layer in accordance with the invention is achieved by a method which is characterized in that the electrically insulating layer is manufactured by means of a sol-gel process in which an aqueous solution of an alkoxysilane compound and an alkoxyzirconium compound is provided on the electrode and converted to the insulating layer by heating said solution, said solution comprising, in addition to water and an organic solvent, the following constituents:

a trialkoxysilane of the formula:

(RO)$_3$Si—R$^1$ wherein R is a C$_1$–C$_5$ alkyl group and R$^1$ is a polymerizable group, and R$^1$ is chemically bonded to the Si atom via an Si—C bond, and a tetraalkoxyzirconate of the formula:

Zr(OR)$_4$ wherein R has the above-mentioned meaning, said thermal treatment being carried out to manufacture the insulating layer from the inorganic network of silicon oxide and zirconium oxide, and to manufacture a polymer from the polymerizable group R$^1$, said polymer being chemically bonded to and intertwined with the inorganic network via Si—C bonds. The sol-gel process is based on homogeneous hydrolysis and polycondensation of silicon alkoxide and zirconium alkoxide in the presence of water. A three-dimensional inorganic network is formed by using trialkoxysilanes and zirconium alkoxide. The group R is a C$_1$–C$_5$ alkyl group. Said trialkoxysilane also comprises a polymerizable group R$^1$ which is chemically bonded to the Si atom via an Si—C bond. The polymerizable groups R$^1$ form polymeric chains which are chemically bonded to the inorganic network via Si—C bonds. The polymeric chains are chemically bonded to and intertwined with the inorganic network. This results in mechanically robust and thermally stable coatings.

Examples of suitable polymerizable R$^1$ groups are epoxy, methacryloxy and vinyl groups. The epoxy groups, methacryloxy groups and vinyl groups polymerize into, respectively, a polyether, a polymethacrylate and a polyvinyl. The epoxy groups can be polymerized thermally; for this purpose, an amine compound may optionally be added to the solution as a catalyst. To polymerize the other groups, the layer must be irradiated with UV light.

Suitable trialkoxysilanes comprising polymerizable R$^1$ groups are, for example, 3-glycidoxy propyl-trimethoxysilane, 3-methacryloxy propyl-trimethoxysilane and vinyl triethoxysilane.

Examples of suitable tetraalkoxy zirconates are:
tetrabutoxyzirconate Zr(OC$_4$H$_9$)$_4$ (TBOZ) and
tetrapropoxyzirconate Zr(OC$_3$H$_7$)$_4$ (TPOZ).

The solution comprises 1 to 50 mol %, preferably 5 to 35 mol %, of the metal-alkoxy compound relative to the other alkoxy compounds. The zirconium oxide is incorporated in the inorganic network by hydrolysis and condensation. By virtue thereof, the above-mentioned advantages regarding chemical and mechanical stability of the insulating layer are achieved. In addition, the stability of the solution is improved by adding the above-mentioned zirconium-alkoxy compound.

The solution may also comprise 0.01 to 10 mol %, relative to the alkoxy compounds, of an aminoalkoxysilane such as 3-aminopropyl-triethoxysilane, or other amine compounds such as trimethyl amine. These amine compounds serve as a catalyst for the thermal polymerization of the epoxy groups.

In addition to water for the hydrolysis reaction, the solution comprises one or more organic solvents such as ethanol, butanol, isopropanol and diacetone alcohol.

The solution can be provided on the electrode by means of customary methods such as spraying or atomizing. To provide the solution, preferably, the electrode is immersed in the solution and subsequently pulled out again at a defined rate. After drying and heating, for example, to 160° C. for 30 minutes, a dense, insulating layer which bonds well to the electrode is obtained in this manner.

To improve the bond between the insulating layer and the electrode, the latter may be etched previously with a suitable etchant. For this purpose, bronze can be treated with an aqueous HCl solution.

The formed insulating layer of a hybrid inorganic-organic material may be thicker than 1 μm, for example up to 10 μm, without causing crackles in the layer. Crackles would result in the layer losing its insulating effect.

To improve the chemical resistance of the coating, optionally, up to 40 mol % (relative to the other alkoxy compounds) of an alkoxysilane comprising a non-polymerizable group such as an alkyl trialkoxysilane or an aryl trialkoxysilane are added to the coating solution. As a result of this addition, the insulating layer becomes more hydrophobic. The alkoxy groups and the alkyl group comprise 1 to 5 C atoms. A suitable aryl trialkoxysilane is, for example, phenyl trimethoxysilane.

It is optionally possible to replace a small part of all of the above-mentioned trialkoxysilane compounds by the corresponding dialkoxysilane compounds. Dialkoxysilane compounds themselves do not lead to a three-dimensional network but to linear polysiloxane chains. As a result, the hardness of the insulating layer will be slightly reduced.

In a suitable embodiment of the method in accordance with the invention, the coating solution comprises the following constituents:

alkoxy compounds, expressed as molar percentages:
  40 to 90 mol % 3-glycidoxypropyl-trimethoxysilane
  5 to 35 mol % tetrabutoxyzirconate
  0.01 to 10 mol % 3-aminopropyl triethoxysilane
  0 to 30 mol % phenyl trimethoxysilane
an organic solvent
water.

The electrode in accordance with the invention can for example be used to round-off lamellas of stainless steel shaver heads and to manufacture slots therein.

These and other aspects of the invention will be apparent from and elucidated with reference to the embodiments described hereinafter.

BRIEF DESCRIPTION OF THE DRAWING

The single FIGURE is a schematic cross-sectional view of an electrode in accordance with the invention in combination with a workpiece.

DESCRIPTION OF THE PREFERRED EMBODIMENTS

A quantity of 62 g tetrabutoxyzirconate are dissolved in 48 g isopropanol to which 21 g ethyl acetoacetate are added as a complexing agent. This solution is added to a mixture of the following silanes:

16 g phenyl trimethoxysilane.

120 g 3-glycidoxy propyl-trimethoxysilane 9 g 3-aminopropyl triethoxysilane.

Subsequently, 100 g isopropanol and 100 g diacetone alcohol are added and mixed. Subsequently, the mixture is hydrolysed by adding water bit by bit until the stoichiometric quantity of water has been added, said mixture, meanwhile, being cooled by means of an ice bath. After all of the water has been added, the solution is stirred at room temperature for 2 hours and subsequently filtered.

The solution obtained comprises alkoxy compounds in the following molar percentages:

10 mol % phenyl trimethoxysilane 65 mol % 3-glycidoxy propyl-trimethoxysilane 5 mol % 3-aminopropyl triethoxysilane 20 mol % tetrabutoxy zirconate.

A bronze electrode which is to be coated is previously etched in an aqueous HCl solution (0.1 mol/l) for 15 s, subsequently rinsed in water and then immersed in an aqueous NaOH solution for 15 s. The electrode is subsequently rinsed in water and blow-dried with nitrogen.

The electrode is then immersed in the above-mentioned solution and subsequently pulled out in a vertical position at a rate of 1 mm/s. The adhering liquid layer is then cured for 3 hours at 160° C., thereby forming an insulating layer in accordance with the invention. The layer obtained has a thickness of 1.5 µm.

The bond between the insulating layer and the electrode surface meets the tape-test requirements.

The FIGURE shows a schematic cross-sectional view of a metal workpiece 1, a bronze electrode 2 having a diameter of 19 mm in which a duct 3 for the supply of electrolyte is formed. The outer side of the electrode 2 and the wall of the channel 3 are provided with 1.5 µm thick insulating layers 4 and 4' which are manufactured in accordance with the above method. The insulating layers 4 and 4' are mechanically removed at the end face and at the location of clamping, for example, by means of grinding, to permit passage of current and electrical contact.

An aqueous $NaNO_3$ solution having a concentration of 250 g/l and a pH between 7.5 and 8.5 is used as the electrolyte in the electrolytic metal-removing process. The electrolyte has a temperature of 20° C. and is circulated through the channel 3 at a rate of 10 l/minute.

An electric current of 7 A is applied between the electrode 2, which is used as the cathode, and the workpiece 1 which is used as the anode. At the area of the uncovered electrode surface, the current density is 24 $A/cm^2$ and at the area of the insulating layer in accordance with the invention, the current density is only 2.5 $mA/cm^2$. The working life of the insulating layer in accordance with the invention is at least 100 hours.

An insulating layer in accordance with the invention can be provided on an ECM electrode at a relatively low temperature of approximately 160° C., so that copper or copper alloys can be used as the electrode material. The insulating layer exhibits a low leakage current of 2.5 $mA/cm^2$ at a thickness of 1.5 µm and has a long working life.

We claim:

1. An electrode for electrochemical machining of electroconductive workpieces, comprising an electrically conductive substrate which is locally covered with an electrically insulating layer, characterized in that the layer comprises an inorganic network of silicon oxide and zirconium oxide and a carbon-containing polymer which is chemically bonded to and intertwined with said inorganic network via Si—C bonds.

2. An electrode as claimed in claim 1, characterized in that the layer has a thickness which ranges between 0.5 and 10 µm.

3. An electrode as claimed in claim 1, characterized in that the layer comprises 5 to 35 mol % zirconium oxide relative to silicon oxide.

4. An electrode as claimed in claim 1, characterized in that the substrate is made from copper or a copper alloy.

* * * * *